(12) United States Patent
Adams

(10) Patent No.: US 6,886,445 B2
(45) Date of Patent: May 3, 2005

(54) FRUIT PICKING METHOD AND APPARATUS

(76) Inventor: John W. Adams, 2106B Ave. B, Bradenton Beach, FL (US) 34217

( * ) Notice: Subject to any disclaimer, the term of this patent is extended or adjusted under 35 U.S.C. 154(b) by 437 days.

(21) Appl. No.: 10/234,674

(22) Filed: Sep. 3, 2002

(65) Prior Publication Data

US 2003/0070409 A1 Apr. 17, 2003

Related U.S. Application Data

(60) Provisional application No. 60/317,212, filed on Sep. 5, 2001.

(51) Int. Cl.[7] ............................................. B05B 1/08
(52) U.S. Cl. .............................. 89/1.1; 239/11; 239/99; 124/75
(58) Field of Search ................... 124/70–77; 89/1.1; 239/11, 99, 101, 102, 311

(56) References Cited

U.S. PATENT DOCUMENTS

| | | | | |
|---|---|---|---|---|
| 4,058,256 A | * | 11/1977 | Hobson et al. | 239/101 |
| 4,712,202 A | * | 12/1987 | Chelminski | 367/144 |
| 4,863,101 A | * | 9/1989 | Pater et al. | 239/99 |
| 4,905,900 A | * | 3/1990 | Scharton et al. | 239/99 |
| 5,927,329 A | * | 7/1999 | Yie | 137/624.13 |
| 6,119,955 A | * | 9/2000 | Starr | 239/11 |
| 6,216,966 B1 | * | 4/2001 | Prendergast et al. | 239/690 |
| 6,250,977 B1 | * | 6/2001 | Ness | 440/38 |
| 6,705,194 B2 | * | 3/2004 | Geskin et al. | 89/1.1 |
| 6,824,076 B2 | * | 11/2004 | Harris | 239/311 |

OTHER PUBLICATIONS

Compressed–Water Pulse Generators and Applications, Kolle, J. J., 2000.*

* cited by examiner

Primary Examiner—Michael Carone
Assistant Examiner—Troy Chambers
(74) Attorney, Agent, or Firm—Arthur W. Fisher III

(57) ABSTRACT

A method and apparatus for picking and collecting fruit from fruit trees comprising a fruit picking assembly including a water cannon to selectively impact fruit to be picked with a water slug to detach the fruit from the fruit tree and a fruit collecting assembly disposed beneath the fruit picking assembly to catch the fruit detatched from the fruit tree.

26 Claims, 10 Drawing Sheets

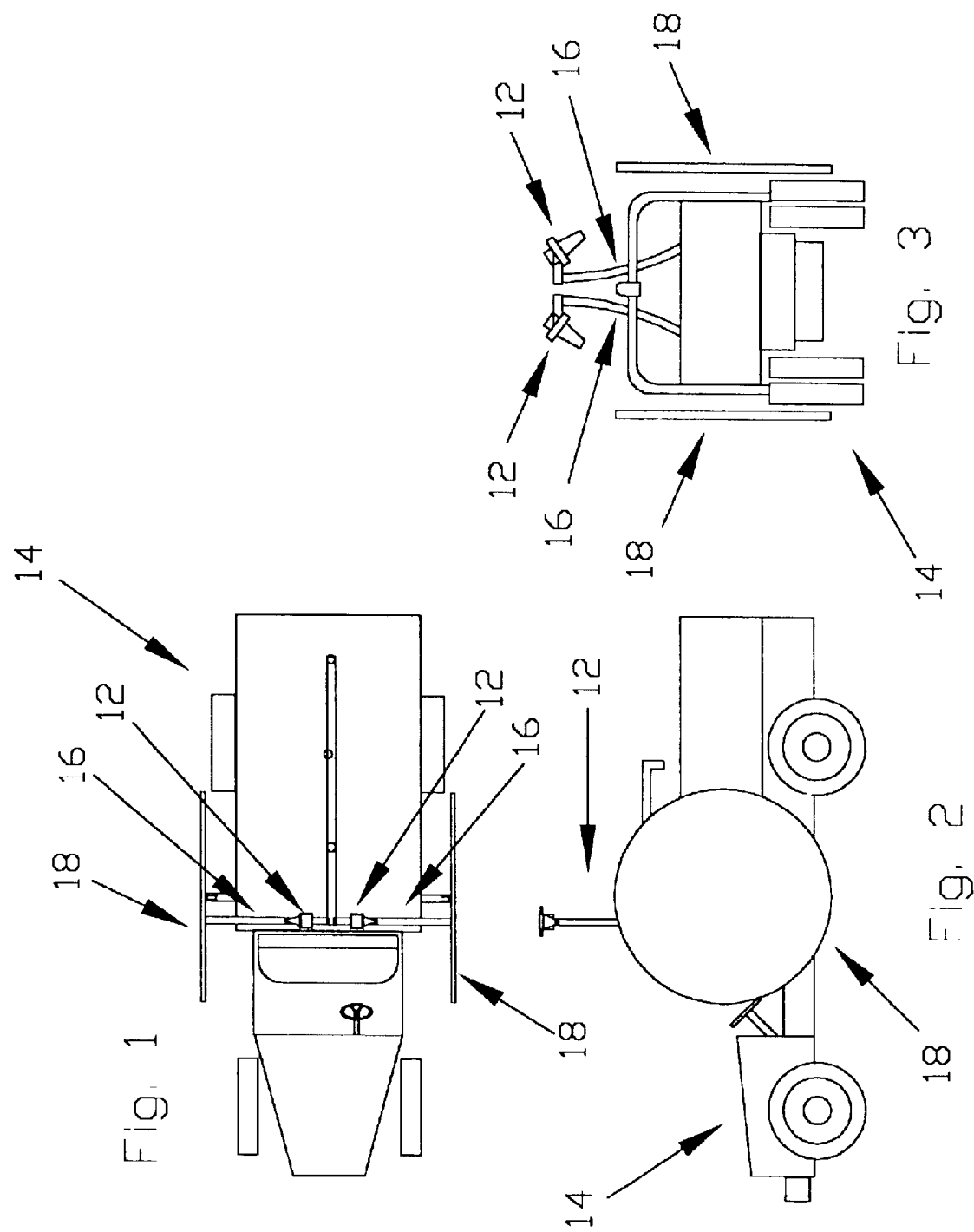

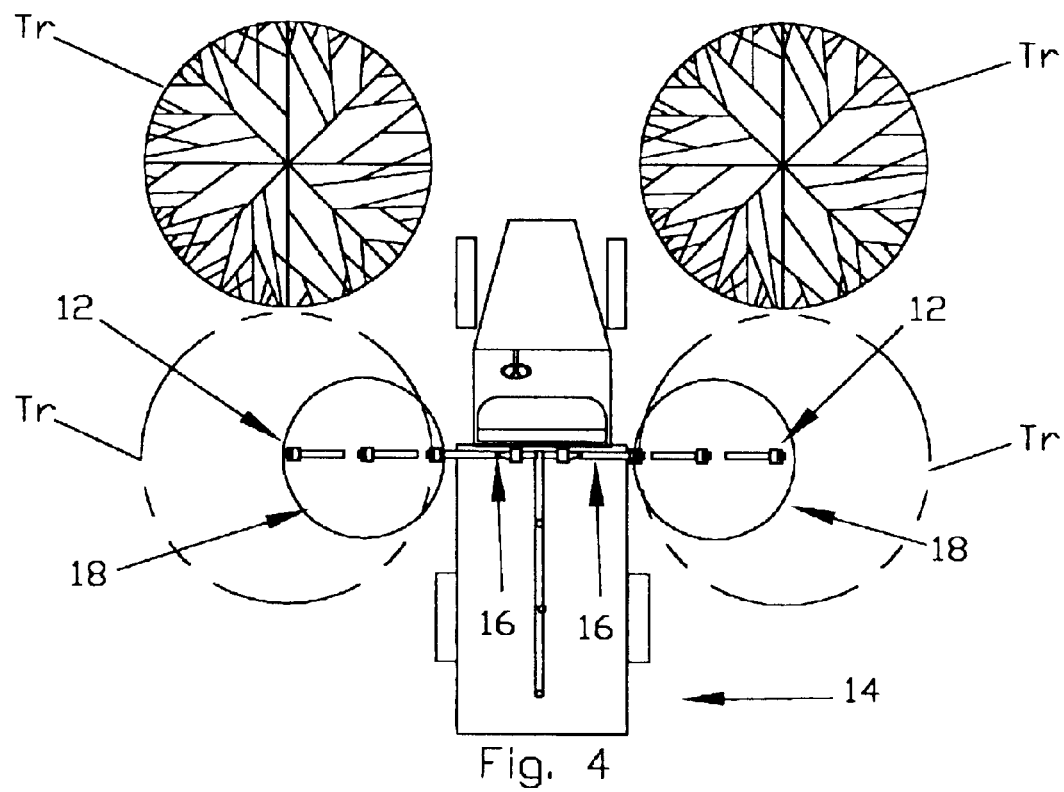
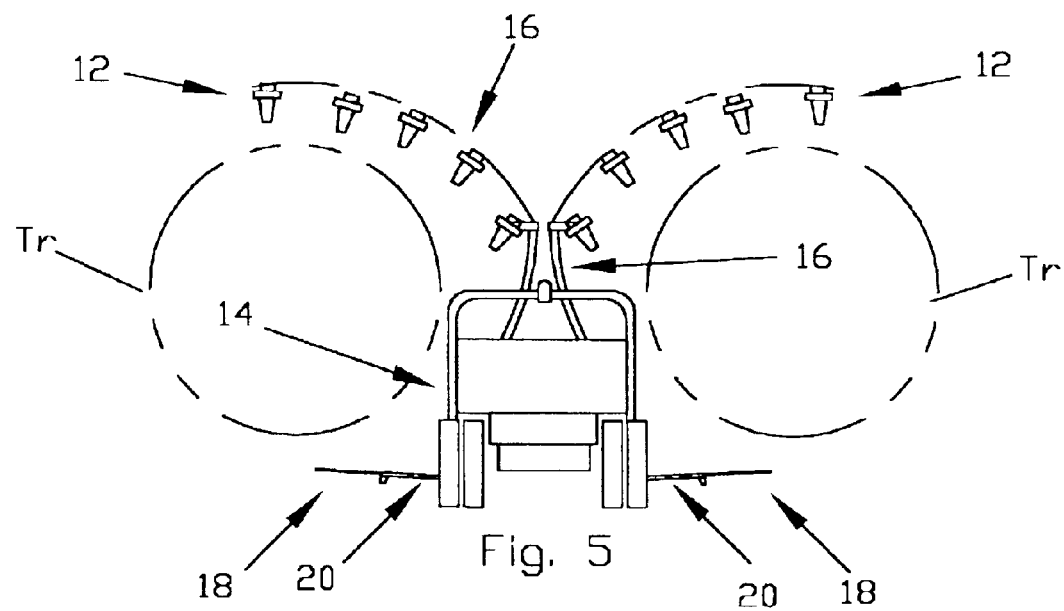

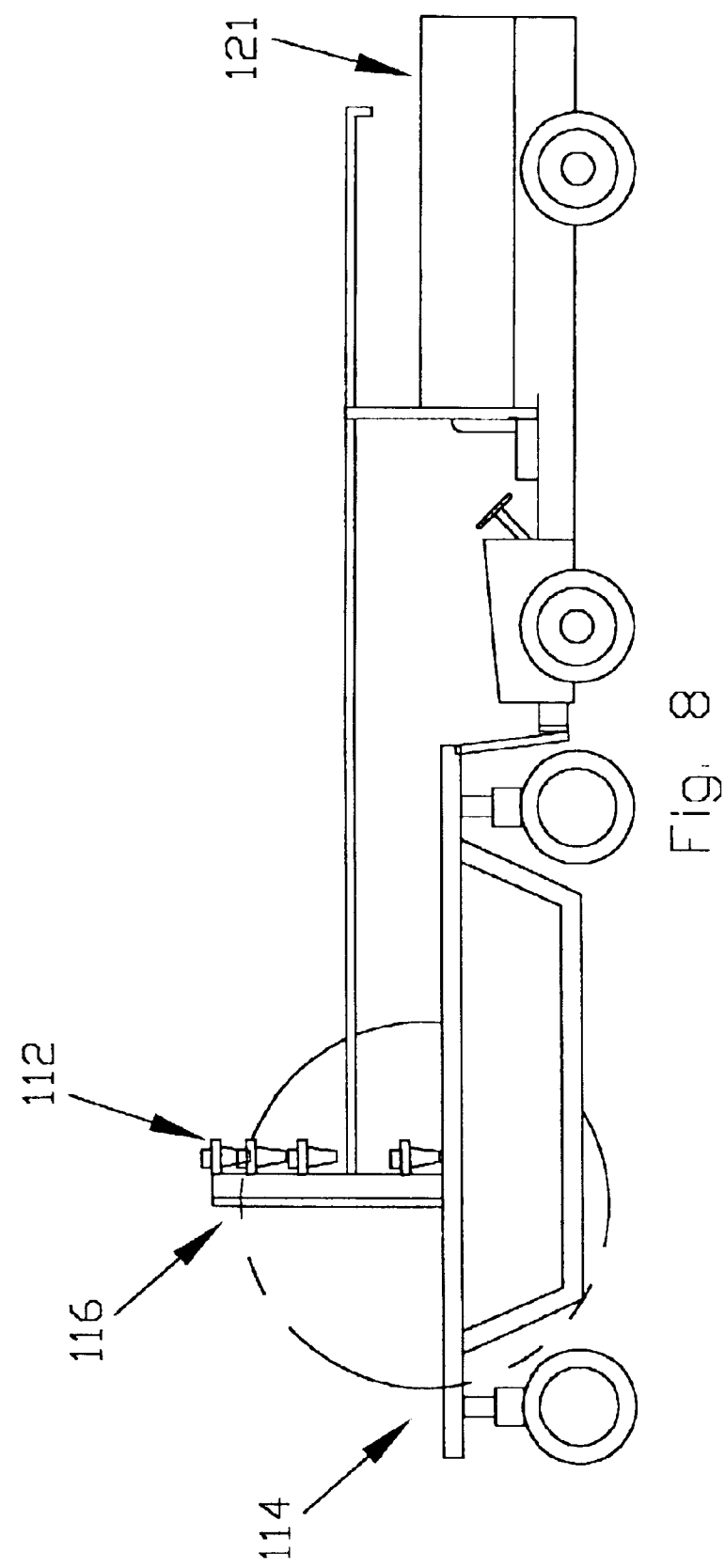

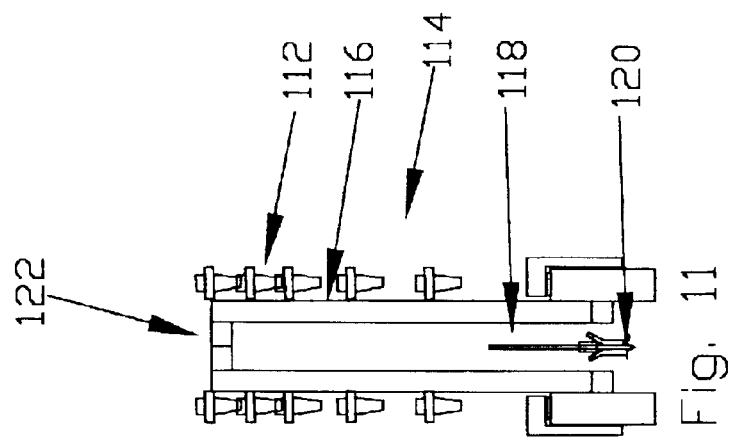
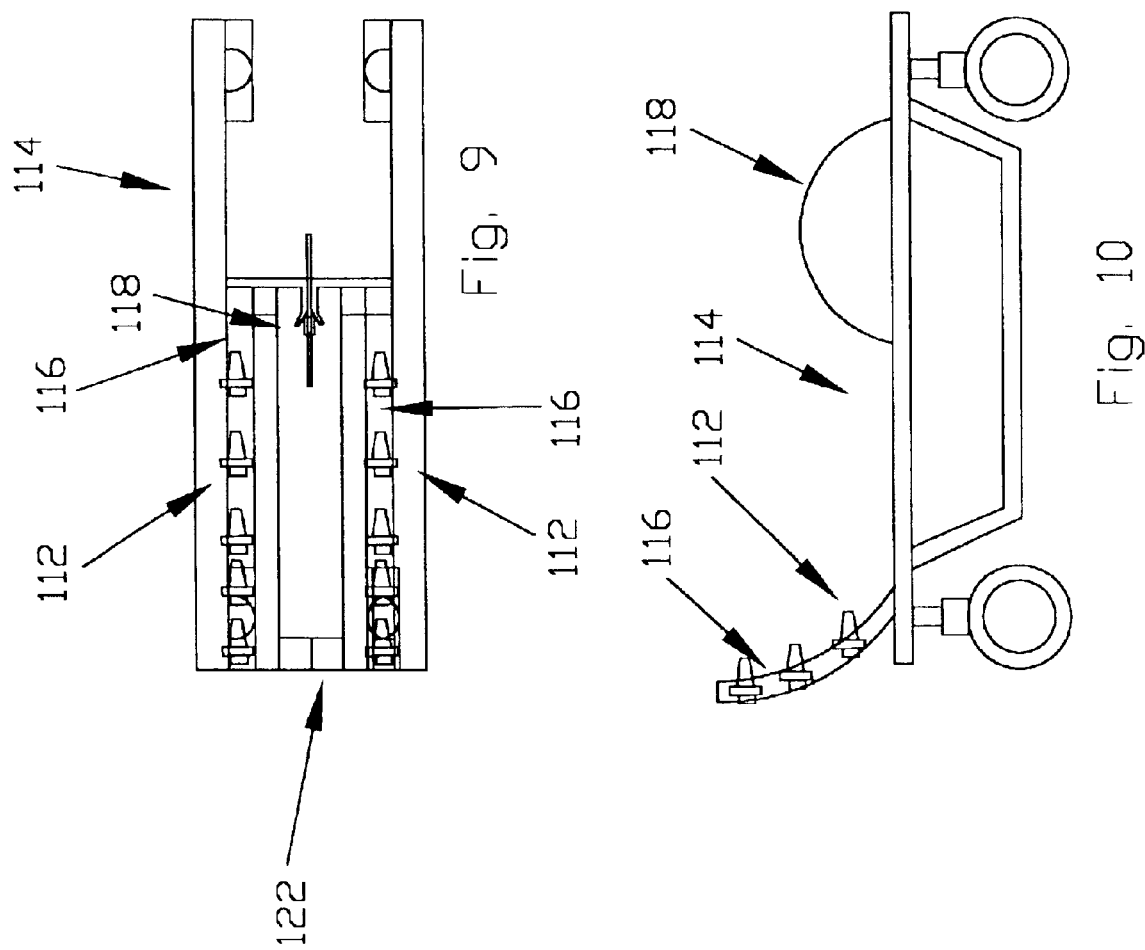

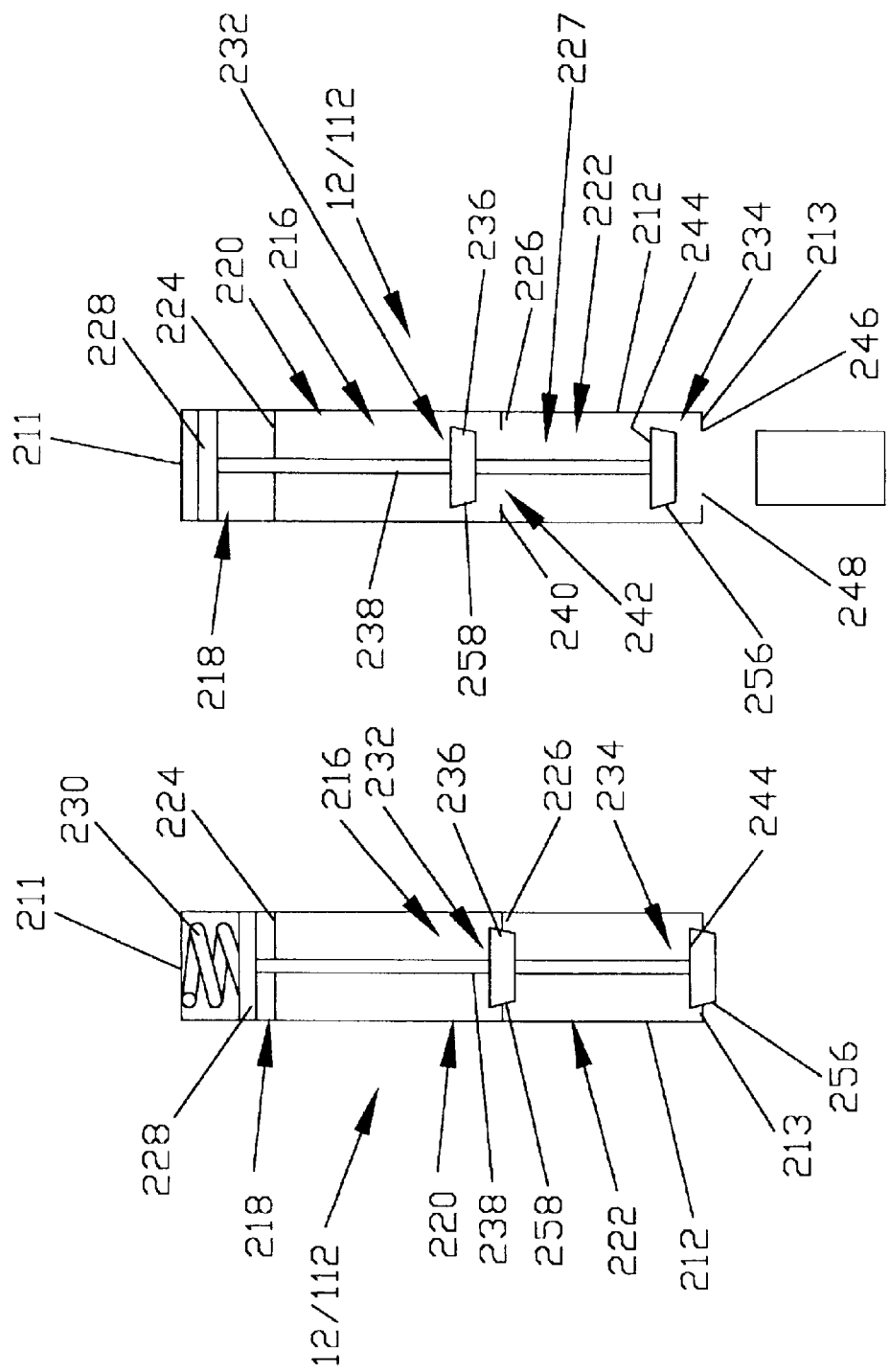

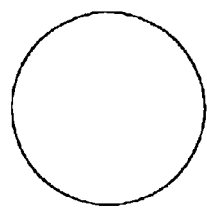
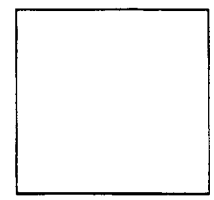
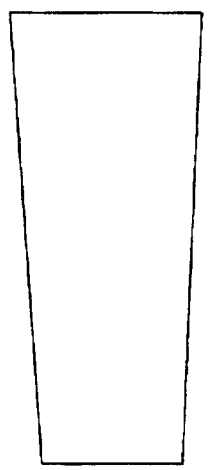
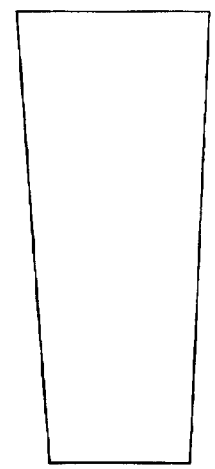
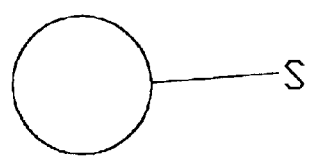
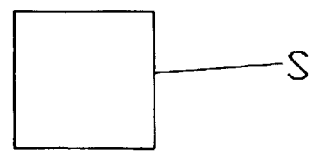
Fig. 17  Fig. 18

FRUIT PICKING METHOD AND APPARATUS

This application claims the benefit of provisional application Ser. No. 60/317,212, filed Sep. 5, 2001.

BACKGROUND OF THE INVENTION

1. Field of the Invention

A method and apparatus for picking and collecting fruit from fruit trees employing a water slug as the fruit detaching force.

2. Description of the Prior Art

Fruit picking devices comprising mechanical means for shaking and vibrating fruit from the tree generally injure the tree due to excessive force. Mechanical devices using rotary members or claws to disengage the fruit from the tree also damage the fruit and/or tree are limited to picking only to the readily available outer fruit requiring a manual ladder picking to complete the picking operation.

Other examples of the prior art disclose hydraulic systems comprising mechanisms for projecting a stream of high velocity mixture of water and air which impinge upon the fruit to force the fruit from the tree when directed over large areas of the tree.

In addition, various sheet material guidance collectors may be supplied under the tree to collect the fallen fruit.

U.S. Pat. No. 3,455,502 describes a mobile fruit harvester including a blower fan structure for conducting a stream of high velocity air through an elongated duct extending upwardly from the fan structure. A curved duct section is mounted on the duct for oscillatory movement to continuously change the direction of the issuing air stream toward crop-bearing trees to dislodge the crop therefrom.

Russian 1,743,459 teaches a fruit picker with hollow fingers on sleeve end rings with outlets in the tips for a pulsating airflow fed to them through a pipe and ring.

Russian 1,176,870 shows a fruit and seed picker including a distribution valve between a nozzle, pulse chamber and compressed air source, and pneumatic cylinder connected to the pulse chamber.

U.S. Pat. No. 3,690,053 relates to a hydraulic fruit picker in which a vehicle is provided with a power-operated elevator for raising and lowering a platform and operator with respect to the fruit area on a tree. The elevator includes a hydraulic device which mixes pressurized water and air into a bubble formation and ejects same at a high velocity from a nozzle. The device includes swivels whereby the operator may direct the output nozzle and water air stream through azimuthal and vertical angles with respect to the tree. Thus the high velocity of the water-air mixture, when impinged upon ripe fruit, will detach same undamaged and permit it to gravitate for collection.

U.S. Pat. No. 3,871,040 discloses an apparatus for harvesting fruit from trees using pulsating jets of compressed air comprising a vertically mounted air tank-guide member to which is slideably attached a blower unit having nozzles at the extremity thereof.

U.S. Pat. No. 3,006,131 shows a berry picking machine comprising a frame to straddle a plant or row of plants wherein the berries, such as blueberries or the like, are removed from the bushes or plants by means of a pulsating current of air.

French 73 23544 discloses a continuous operation fruit gathering machine comprising a frame mounted on wheels bearing a vertical duct equipped along its length with air jets supplied from a blower fan driven by its own or the tractor engine. The machine, in handed pairs, moves continuously along the rows of trees blowing the fruit, particularly plums, on to the receiving area of the machine from which they are tipped onto a conveyor belt which carries them to palette boxes. The receiving area is formed from inclined plates extending outwardly from the conveyor.

Russian SU 697,085 describes a fruit and seed harvester including a pivoted pressure pipe with telescopic nozzle for pulsed airflow and a soft mesh net to catch the fruit.

U.S. Pat. No. 4,175,368 discloses a system and apparatus to blast air into the tree to be harvested from the circumference of a circle. A plurality of nozzles may be arranged around the circumference of the circles and the blast shifted from one nozzle to the adjacent nozzle in succession alternately. A nozzle delivering a continuous blast of air is mounted to rotate about the circumference of the circle. The rotating units are mounted on a mobile base so that they can be drawn horizontally along a row of trees.

U.S. Pat. No. 3,943,688 teaches a fruit harvesting machine consisting of a wheeled support on which is mounted a vertically extending housing containing a pair of transversely arranged blowers having a laterally facing discharge passage. Movable air guiding members are mounted in the discharge passage in a vertical array.

U.S. Pat. No. 5,544,474 relates to a system of harvesting tools and manipulators for harvesting crop items hanging by stems from their growth sources including a track extending substantially parallel to and in a spaced relationship from one or more of the growing areas of crops and a trolley driven along the track which includes farm equipment for executing a farming activity on the growing area of the crops. One embodiment of a harvesting tool includes a base and a cutter head mounted on the base having an array of fingers for accommodating the stem between a pair of adjacent fingers, the array having a substantially arcuate configuration and dimensioned so as to envelop at least the top portion of the crop item and a stem cutter for cutting the stem when accommodated by a pair of adjacent fingers.

U.S. Pat. No. 5,426,927 teaches an automated fruit picker comprising a base, a flexible arm containing two segments movably attached to each other, a cutting assembly attached to the flexible arm, and a controller for varying the angle between the arms and the height of the flexible arm.

U.S. Pat. No. 4,975,016 describes an automated machine comprising a handler mounted with a rotating aptitude about two perpendicular and intersecting rotational axes having a free end fitted with a mechanical hand comprising an intake head.

U.S. Pat. No. 4,718,223 teaches a harvesting apparatus for automatically removing fruit comprising a harvesting hand mounted at a distal end of an articulated arm assembly, a video camera for picking p a fruit image and a control unit for guiding the harvesting hand to the fruit in response to information provided by the video camera. The harvesting hand includes a vacuum pad for drawing and catching the fruit, and a calyx-cutting device.

U.S. Pat. No. 4,663,925 discloses a disposed fruit harvesting robot comprising detecting sensors arranged around an opening of a cylindrical case for taking in fruit.

U.S. Pat. No. 4,532,757 relates to a method and system for harvesting fruit comprising a modular housing with a mechanism for disposing the housing opposite a picking zone of a tree with an open side thereof defining a picking aperture. An extensible picking arm is placed at the geometric center. A set of grippers is closed onto the fruit and stem to separate the fruit. An articulated collection arm follows the picking arm and collects the picked fruit in a cup and subsequently drops the fruit into a collection system.

U.S. Pat. No. 4,519,193 discloses a fruit harvesting apparatus including a movable fruit picker that can be moved to a determined position of the fruit and opened to pick the fruit.

U.S. Pat. No. 4,482,960 teaches an electro-optical and microcomputer based method and apparatus for automatically guiding tractors and other farm machinery for the purpose of automatic crop planting, tending and harvesting.

U.S. Pat. No. 4,873,644 discloses a produce identifying apparatus for deriving positional data of an object based on a particular color corresponding to the object from image data provided by a video camera and a guide apparatus for a produce handling machine equipped with the produce identifying apparatus.

Additional examples of the prior art are found in U.S. Pat. No. 3,200,575; U.S. Pat. No. 3,527,039; U.S. Pat. No. 3,561,205; German 3,835,715; German 4,116,728; Japan 491,719 and Japan 5,168,332.

BRIEF DESCRIPTION OF THE DRAWINGS

For a fuller understanding of the nature and object of the invention, reference should be had to the following detailed description taken in connection with the accompanying drawings in which:

FIG. 1 is a top view of the apparatus of the present invention for picking and collecting fruit trees in the travel configuration.

FIG. 2 is a side view of the apparatus of the present invention for picking and collecting fruit from fruit trees in the travel configuration.

FIG. 3 is a rear view of the apparatus of the present invention for picking and collecting fruit from fruit trees in the travel configuration.

FIG. 4 is a top view of the apparatus of the present invention for picking and collecting fruit from fruit trees in the deployed configuration.

FIG. 5 is a rear view of the apparatus of the present invention for picking and collecting fruit from fruit trees in the deployed configuration.

FIG. 8 is a partial rear view of the alternate embodiment of the apparatus of the present invention for picking and collecting fruit from fruit trees in the deployed configuration.

FIG. 9 is a partial top view of the alternate embodiment of the apparatus of the present invention for picking and collecting fruit from fruit trees in the travel configuration.

FIG. 10 is a partial side view of the alternate embodiment of the apparatus of the present invention for picking and collecting fruit from fruit trees in the travel configuration.

FIG. 11 is a partial rear view of the alternate embodiment of the apparatus of the present invention for picking and collecting fruit from fruit trees in the configuration.

FIG. 14 is a cross-section schematic of the water cannon of the present invention in the charged mode.

FIG. 15 is a cross-sectional schematic of the water cannon of the present invention in the firing mode.

FIG. 17 is a schematic view of a round cannon nozzle of the present invention discharging a round slug.

FIG. 18 is a schematic view of a rectilinear cannon nozzle of the present invention discharging a rectilinear slug.

Similar reference characters refer to similar parts throughout the several views of the drawings.

DETAILED DESCRIPTION OF THE PREFERRED EMBODIMENT

Figure 6:
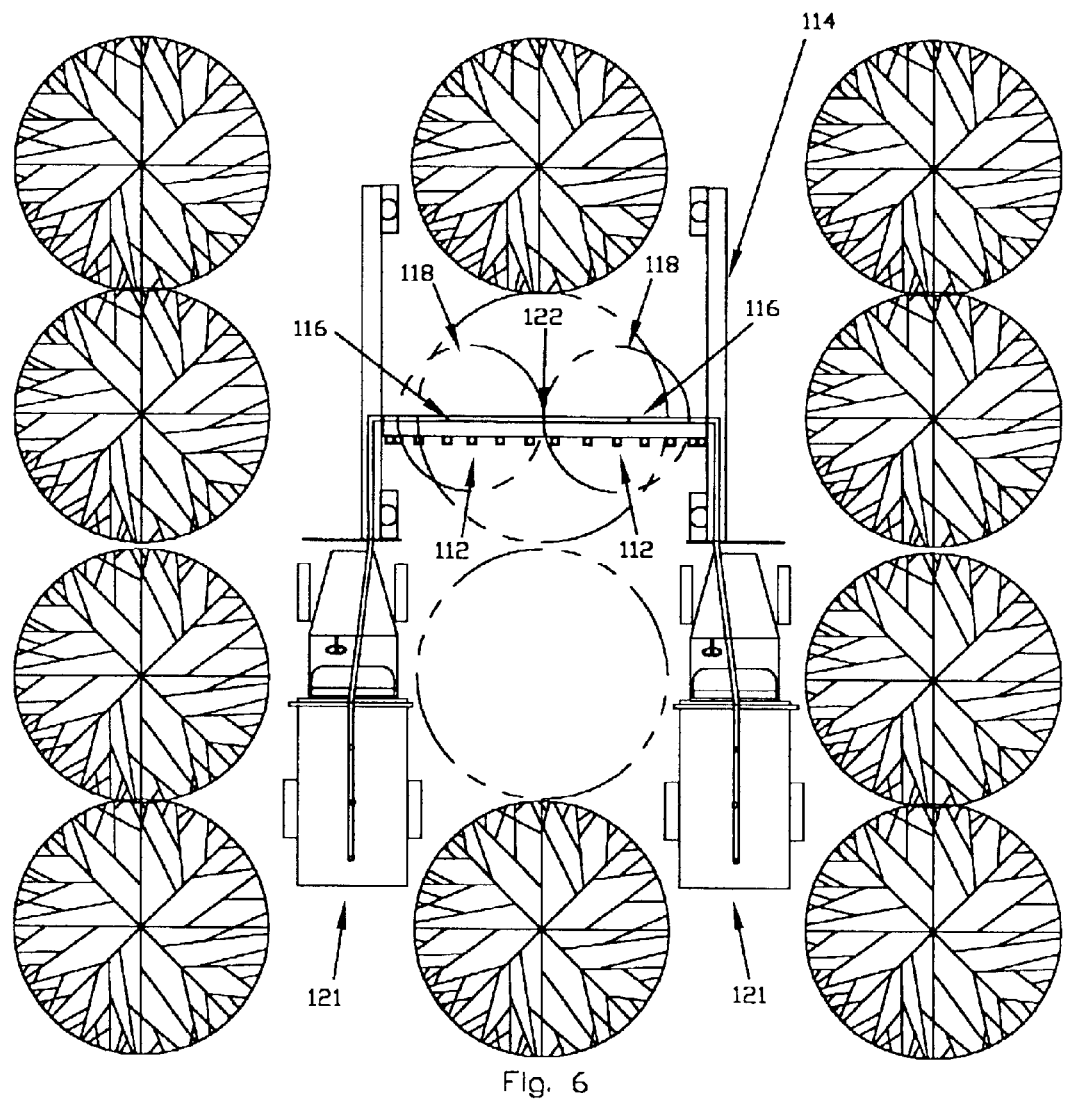
FIG. 6 is a top view of an alternate embodiment of the apparatus of the present invention for picking and collecting fruit from fruit trees in the deployed configuration.

The present invention relates to a method and apparatus for picking and collecting fruit from fruit trees comprising a fruit picking assembly to detach the fruit from a fruit tree and a fruit collecting assembly to catch the fruit detached from the fruit tree.

FIGS. 1 through 3 depict the apparatus of the present invention in a travel configuration; while, FIGS. 4 and 5 depict the apparatus of the present invention in an operating configuration. In particular, the fruit picking assembly comprises a pair of water cannons each generally indicated as 12 movable between a retracted or stored position and an extended or deployed position operatively mounted to a self-propelled vehicle generally indicated as 14 by a corresponding telescoping support structure generally indicated 16 and the fruit collecting assembly comprises a corresponding pair of fruit collectors each generally indicated as 18 movable between stored position and an extended or deployed position pivotally mounted to the self-propelled vehicle 14 by a corresponding mounting structure generally indicated as 20.

When in retracted or stored position as shown in FIGS. 1 through 3, the water cannons 12 are disposed or located within the bed area or section of the self-propelled vehicle 14. When the water cannons 12 are extended or deployed as shown in FIGS. 4 and 5, the water cannons 12 are disposed or located over the fruit bearing trees each indicated as Tr in adjacent rows to detach fruit therefrom as the self-propelled vehicle 14 is driven therebetween as described more fully hereinafter.

When in the stored position as shown in FIGS. 1 through 3, the fruit collectors 18 are substantially vertically disposed adjacent the sides of the bed area or section of the self-propelled vehicle 14. When the fruit collectors 18 are in the extended or deployed position as shown in FIGS. 4 and 5, the fruit collectors 18 are substantially horizontally disposed to extend beneath the fruit bearing trees Tr in adjacent rows to catch and collect fruit detached from the fruit tree Tr by the corresponding water cannon 12 as described more fully hereinafter.

Figure 7:
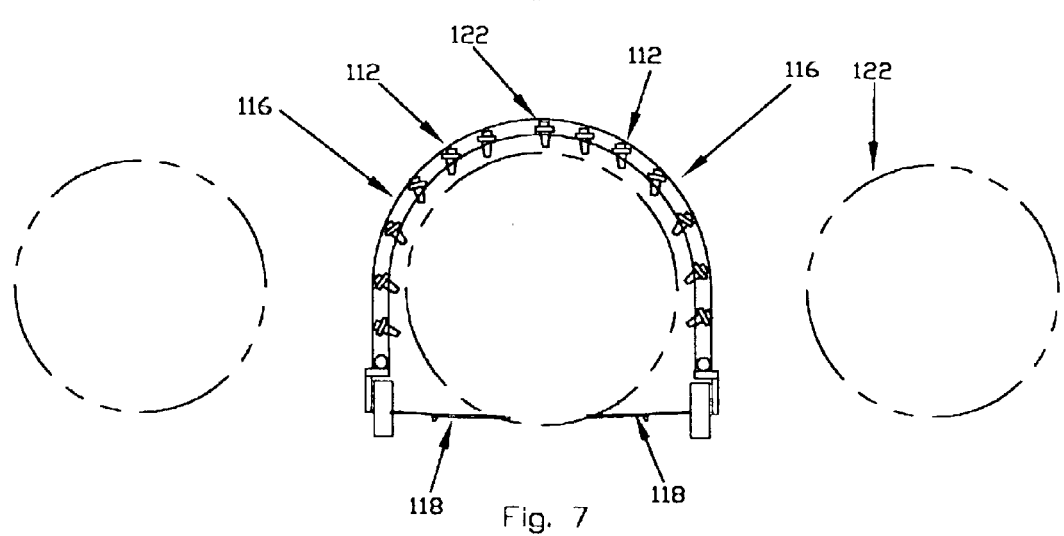
FIG. 7 is a side view of the alternate embodiment of the apparatus of the present invention for picking and collecting fruit from fruit trees in the deployed configuration.

FIGS. 6 through 8 depict an alternate embodiment of the apparatus of the present invention in an operating configuration; while, FIGS. 9 through 11 depict the alternate embodiment of the present invention in a travel configuration. Specifically, the fruit picking assembly comprises a pair of water cannon arrays each including a plurality of water cannons each generally indicated as 112 movable between a retracted or stored position and an extended or deployed position operatively mounted to a self-propelled gantry generally indicated as 114 by a corresponding extendable support structure generally indicated as 116 and the fruit collecting assembly comprises a corresponding pair of fruit collectors each generally indicated as 118 movable between a stored position and an extended or deployed position pivotally mounted to the self-propelled gantry 114 by a corresponding mounting structure generally indicated as 120. Each side of the self-propelled gantry 114 is detachable coupled to a self-propelled vehicle 121 similar to the self-propelled vehicle 14 shown in FIGS. 1 through 5 used to collect the fruit.

When in retracted or stored position as shown in FIGS. 9 through 11, the self-propelled gantry 114 is folded along a pivot or hinge 122 such that the pair of the water cannon arrays are disposed parallel relative to each other disposed or located within the sides of the self-propelled gantry 114. When the water cannons 112 are deployed as shown in FIGS. 6 through 8, the pair of the water cannon arrays cooperatively form an arc over the fruit bearing trees Tr progressively in a single row to detach fruit therefrom as the self-propelled gantry 114 is propelled through the grove as described more fully hereinafter.

When in the stored position as shown in FIGS. 9 through 11, the fruit collectors 118 are substantially vertically disposed between the sides of the self-propelled gantry 114. When the fruit collectors 118 are in the extended or deployed position as shown in FIGS. 6 through 8, the fruit collectors 118 are substantially horizontally disposed to extend beneath the fruit bearing trees Tr progressively in a single row to catch and collect fruit detached from the fruit tree Tr by the water cannons 112 as described more fully hereinafter.

The structure and operation of each water cannon 12/112 is best understood with reference to FIGS. 12 through 15. Each water cannon 12/112 comprises a hollow barrel 212 having an outlet nozzle generally indicated as 214 disposed at one end portion thereof and a firing mechanism generally indicated as 216 disposed therein. The hollow barrel 212 including a first and second exterior wall 211 and 213 respectively comprising a firing chamber 218 formed by the first exterior wall 211 and a first interior wall 224, a propellant chamber 220 formed by the first interior wall 224 and a second interior wall 226 and a liquid slug chamber 227 formed by the second interior wall 226 and second exterior wall 213. The firing mechanism 216 comprises a firing piston or actuator 228 selectively movable between a first and second position normally held or biased in the first position by a spring or bias member or positioning element 230, a propellant valve or flow control generally indicated as 232 and a liquid valve or flow control generally indicated as 234.

Figure 12:
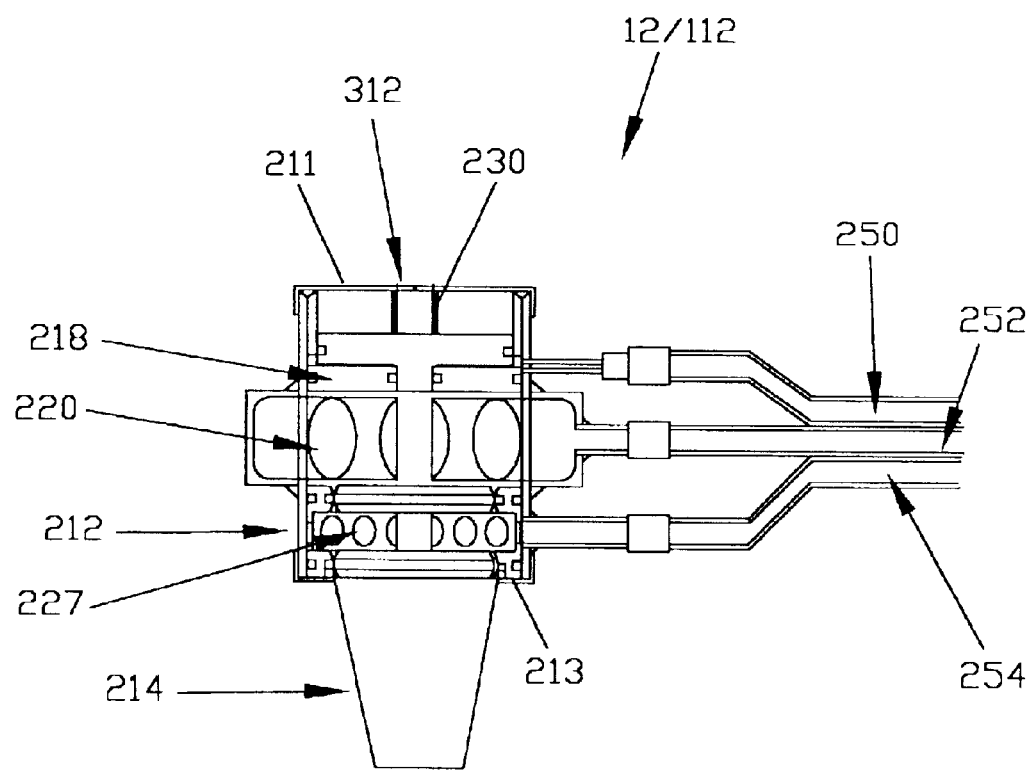
FIG. 12 is a partial side view of the water cannon of the present invention.
Figure 13:
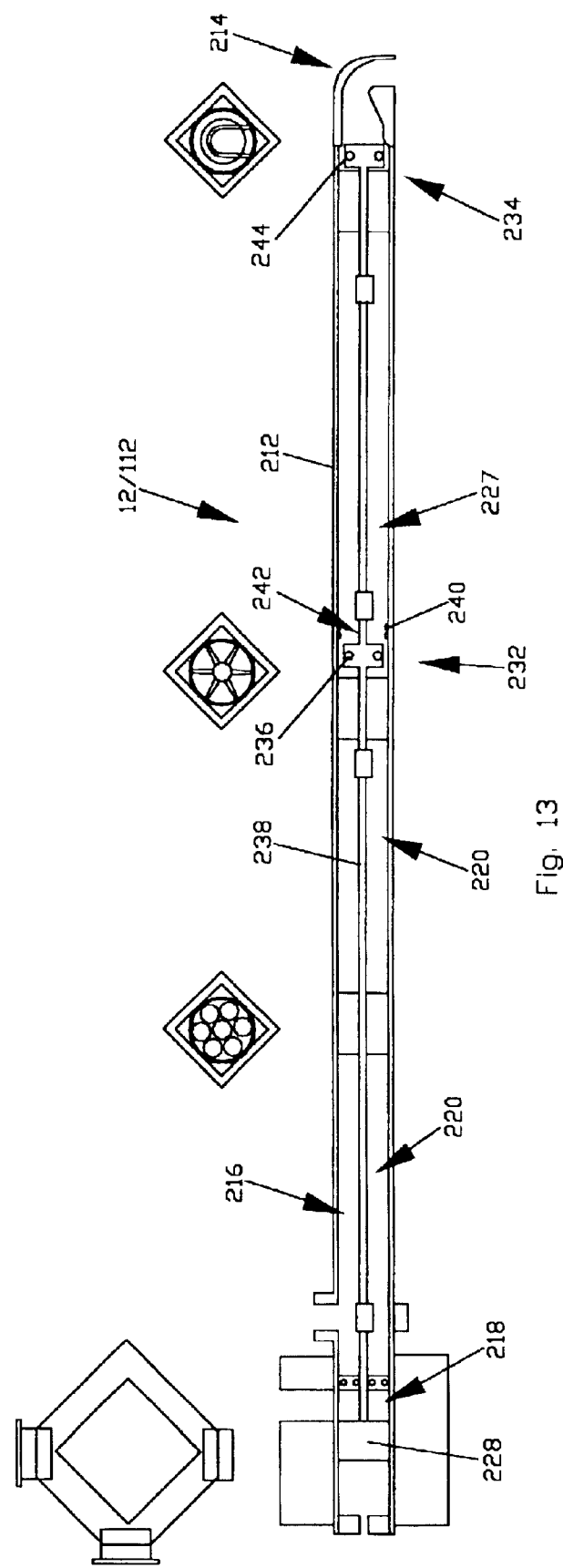
FIG. 13 is a partial cross-section side view of the water cannon of the present invention.

FIG. 12 shows the outlet nozzle 214 coaxially aligned with the hollow barrel 212; while, FIG. 13 shows the outlet nozzle 214 disposed at an angle relative to the centerline of the hollow barrel 212. As depicted in FIG. 13, the outlet nozzle 214 has an outlet disposed substantially ninety (90°) degrees relative to the longitudinal centerline of the hollow barrel.

The propellant valve or flow control 232 comprises a propellant valve member 236 movable between a first position and a second position affixed to the mid portion of a firing pin or shaft 238 attached at one end portion to the firing piston 218 and a corresponding propellant valve seat 240 to control the flow of pressurized air through a propellant aperture 242.

The liquid valve or flow control 234 comprises a liquid valve member 244 movable between a first position and a second position affixed to the outer portion of the firing pin or shaft 238 and a corresponding liquid valve seat 246 to control the flow of liquid forced through a liquid aperture 248 and outlet nozzle 214 by the pressurized air propellant flowing from the propellant chamber 220 through the propellant aperture 242 when the firing mechanism 216 and the piston or actuator 228 is moved from the first position to the second position as described more fully hereinafter.

As best shown in FIG. 12, fluids are fed to the firing chamber 218, the propellant chamber 220 and the liquid slug chamber 227 from fluid sources (not shown) through fluid conduits 250, 252 and 254 respectively. Specifically, the propellant chamber 220 is charged with a high pressure gas such as air from an external source (not shown) through a flow control (not shown) and the fluid conduit 252; while, the liquid slug chamber 227 is charged with a fixed or predetermined volume of water from an external source (not shown) through a flow control (not shown) and the fluid conduit 254. The firing chamber 218 is coupled to a high pressure gas source (not shown) and a flow control (not shown) through the fluid conduit 250 to selectively supply high pressure gas to the firing chamber 218 to trigger the water cannon 12/112 to move the firing piston or actuator 228 from the first position to the second position to move each propellant valve member 236 and the liquid valve member 244 from the first position to the second position to open the propellant aperture 242 and liquid aperture 248 respectively to release the pressurized gas and the water from the propellant chamber 220 and the liqid slug chamber 227 respectively to discharge a bullet or slug from the nozzle 214 of the water canon 12/112.

Figure 16:
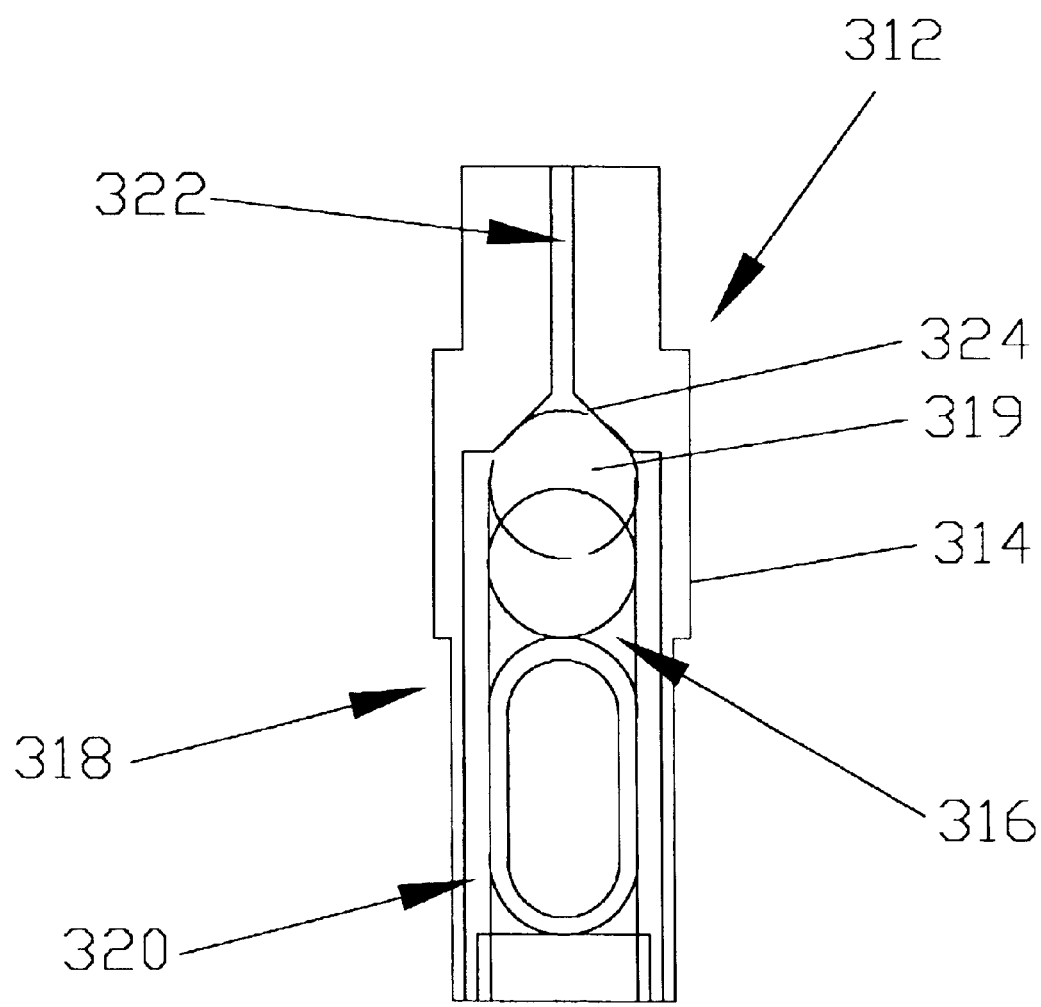
FIG. 16 is a cross-sectional side view of the water chamber-charging vent of the present invention.

After the water is forced from the liquid slug chamber 227 upon firing of the water cannon 12/112, the liquid slug chamber 227 contains air at plenum pressure. As shown in FIGS. 12 and 16, when the liquid slug chamber 227 is refilled with low-pressure water, a vent or air valve generally indicated as 312 allows air within the liquid slug chamber 227 to vent into the atmosphere. Thus, air is vented or forced from the liquid slug chamber 227 as the liquid slug chamber 227 is refilled with water after each firing of the water cannon 12/112.

As shown in FIG. 16, the vent or air valve 312 comprises a valve body 314 including a liquid float chamber 316 having a float check member generally indicated as 318 including a float 319 movably disposed therein and an air vent passage 320 terminating in an air vent 322 such that as water fills the liquid slug chamber 227 water enters the liquid float chamber 316 causing the float check member 318 to rise toward the valve seat 324 formed between the air vent passage 320 and the air vent 322. At the same time, air above the water in the liquid slug chamber 227 is forced through the air vent passage 320 and into the atmosphere through the air vent 322 in advance of the water. As the water fills the liquid slug chamber 227 and the liquid float chamber 316, the air is essentially forced from the liquid slug chamber 227. The float check valve 318 rises as the water fills the liquid float chamber 316 until the float 319 seats against the valve seat 324 to hold the charge of water in the liquid slug chamber 227 until the water cannon 12/112 is fired.

As the water cannon 12/112 is translated horizontally between shots, a circular bullet or slug S as shown in FIG. 17 will not cover the entire area. The use of a square nozzle 214 as shown in FIG. 18 can help eliminate the spaces between circles.

Because the fruit must be caught and rapidly loaded, in addition to fruit collector 18/118, an air educator may be used to convey the fruit from the catcher to the receptacle.

Air educators are similar to the vacuum systems used in banks to convey the plastic container from the drive-in window to each car, except that compressed air jets pointing up tube are used to create the air current. The air current conveys the fruit through a tube to the device accepting the fruit.

As previously described, the liquid slug chamber 227 filled with water is enclosed on opposite ends by propellant valve or control 232 and the liquid valve or flow control 234. Above the liquid slug chamber 227, the propellant chamber 220 is filled with compressed air. Both the propellant valve or control 232 and the liquid valve or flow control 234 are coupled to firing piston or actuator 228 by the firing pin or shaft 238.

As previously discussed, opening the valve flow control (not shown) to supply the firing chamber 218 with an impulse of high pressure gas moves the firing piston 228 from the first position to the second position moving both the propellant valve or flow control 232 and the liquid valve or flow control 234 to the second position opening the propellant aperture 242 and the liquid aperture 248 to release a bullet or slugs of water from the outlet nozzle 214. However, since the land or valve sealing surface 256 of the liquid valve member 244 is longer than the land or valve sealing surface 258 of the propellant valve member 236, the propellant valve or flow control 232 opens before the liquid valve or flow control 234 raising the water pressure in the liquid slug chamber 227 to that of the air pressure, in effect charging the water before the bullet or slug S is released. Once the water cannon 12/112 is fired, the positioning element 230 returns the firing piston or actuator 228, propellant valve or flow control 232 and liquid valve or flow control 234 from the second position to the first position. The check valve 312 in the supply water line allows the inflow of water at a low pressure and prevents the water from leaving by the supply line when changed to a higher pressure.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,
What is claimed is:

1. A water cannon capable of selectively discharging a water slug to impact an object comprising a hollow barrel having an outlet disposed at one end portion thereof and a firing mechanism disposed therein, said hollow barrel comprising a firing chamber to selectively receive a firing charge of gas, a propellant chamber to retain a propellant gas therein and a liquid slug chamber to retain water therein disposed in operative relationship relative to each other, said firing mechanism comprising a firing actuator selectively movable between a first position and a second position when said firing chamber receives a firing charge of gas, said firing actuator normally held in said first position by a positioning element, a propellant flow control selectively movable between a first position and a second position and a liquid flow control selectively movable between a first position and a second position when said firing actuator is moved from said first position to said second position such that the propellant gas from said propellant chamber forces the water in said liquid slug chamber from said outlet as a water slug to impact on an object.

2. The water cannon of claim 1 wherein said propellant flow control comprises a propellant valve member including a sealing surface movable between a first position and a second position affixed to the mid portion of a firing pin attached at one end portion to a firing piston and a corresponding propellant valve seat to control the flow of pressurized propellant gas through a propellant aperture and said liquid flow control comprises a liquid valve member including a sealing surface movable between a first position and a second position affixed to the outer portion of said firing pin and a corresponding liquid valve seat to control the flow of water forced through a liquid aperture and said outlet by the pressurized propellant gas flowing from said propellant chamber through said propellant aperture when said firing mechanism and said firing actuator is moved from said first position to said second position.

3. The water cannon of claim 2 wherein fluids are fed to said firing chamber, said propellant chamber and said liquid slug chamber from external fluid sources through corresponding fluid conduits.

4. The water cannon of claim 2 wherein said sealing surface of said liquid valve member is longer than said sealing surface of said propellant valve member such that said propellant flow control opens before said liquid flow control raising the water pressure in said liquid slug chamber to that of the propellant gas pressure before the slug is released from said outlet.

5. The water cannon of claim 3 wherein said propellant chamber is charged with a high pressure gas from an external source and said liquid slug chamber is charged with predetermined volume of water.

6. The water cannon of claim 5 wherein said firing chamber is coupled to a high pressure gas source through said corresponding fluid conduit to selectively supply high pressure gas to said firing chamber to trigger said water cannon to move said firing actuator from said first position to said second position to move said propellant valve member and liquid valve member from said first position to said second position to open said propellant aperture and to move said liquid aperture to release the pressurized gas and the water from said propellant chamber and said liquid slug chamber respectively to discharge a water slug from said outlet.

7. The water cannon of claim 5 where said water cannon further includes a vent to allow air within said liquid slug chamber to vent into the atmosphere when said liquid slug chamber is filled with low-pressure water after each firing.

8. The water cannon of claim 7 wherein said vent comprises a valve body including a liquid float chamber having a float movably disposed therein and an air vent passage terminating in an air vent such that as water fills said liquid slug chamber water enters said liquid float chamber causing said float to rise toward a valve seat formed between said air vent passage and said air vent whereby air above the water in said liquid slug chamber is forced through said air vent passage and into the atmosphere through said air vent in advance of the water, said float rises as the water fills said liquid float chamber until said float seats against said valve seat to hold the charge of water in said liquid slug chamber until said water cannon is fired.

9. An apparatus for picking and collecting fruit from fruit trees comprising a fruit picking assembly including at least one water cannon having means to selectively discharge a water slug to impact fruit to be picked with the water slug to detach the fruit from the fruit tree and a fruit collecting assembly disposed beneath said fruit picking assembly to catch the fruit detached from the fruit tree.

10. The apparatus for picking and collecting fruit of claim 9 wherein said water cannon is movable between a retracted position and an extended position operatively mounted to a vehicle by a telescoping support structure and said fruit collecting assembly comprises a fruit collector movable between stored position and an extended position pivotally mounted to the vehicle by a corresponding mounting structure.

11. The apparatus for picking and collecting fruit of claim 10 wherein when retracted, said water cannon is disposed within the bed area of or section of the vehicle and when said water cannon is extended, the water cannon is disposed over the fruit bearing trees.

12. The apparatus for picking and collecting fruit of claim 11 wherein when stored, said fruit collector is substantially vertically disposed adjacent the sides of the bed area or section of the vehicle and when said fruit collector is extended, said fruit collector is substantially horizontally disposed to extend beneath the fruit bearing trees to catch and collect fruit detached from the fruit tree by said water cannon.

13. The apparatus for picking and collecting fruit of claim 10 wherein when stored, said fruit collector is substantially vertically disposed adjacent the sides of the bed area or section of the vehicle and when said fruit collector is extended, said fruit collector is substantially horizontally disposed to extend beneath the fruit bearing trees to catch and collect fruit detached from the fruit tree by said water cannon.

14. The apparatus for picking and collecting fruit of claim 13 wherein when retracted, said water cannon is disposed within the bed area of or section of the vehicle and when said water cannon is extended, the water cannon is disposed over the fruit bearing trees.

15. The apparatus for picking and collecting fruit of claim 9 wherein said means to selectively discharge a water slug comprises a hollow barrel having an outlet disposed at one end portion thereof and a firing mechanism disposed therein, said hollow barrel comprising a firing chamber to selectively receive a firing charge of gas, a propellant chamber to retain a propellant gas therein and a liquid slug chamber to retain water therein disposed in operative relationship relative to each other, said firing mechanism comprising a firing actuator selectively movable between a first position and a second position when said firing chamber receives a firing charge of gas, said firing actuator normally held in said first position by a positioning element, a propellant flow control selectively movable between a first position and a second position and a liquid flow control selectively movable between a first position and a second position when said firing actuator is moved from said first position to said second position such that the propellant gas from said propellant chamber forces the water in said liquid slug chamber from said outlet as a water slug to impact on an object.

16. The apparatus for picking and collecting fruit of claim 15 wherein said propellant flow control comprises a propellant valve member including a sealing surface movable between a first position and a second position affixed to the mid portion of a firing pin attached at one end portion to a firing piston and a corresponding propellant valve seat to control the flow of pressurized propellant gas through a propellant aperture and said liquid flow control comprises a liquid valve member including a sealing surface movable between a first position and a second position affixed to the outer portion of said firing pin and a corresponding liquid valve seat to control the flow of water forced through a liquid aperture and said outlet by the pressurized propellant gas flowing from said propellant chamber through said propellant aperture when said firing mechanism and said firing actuator is moved from said first position to said second position.

17. The apparatus for picking and collecting fruit of claim 16 wherein fluids are fed to said firing chamber, said propellant chamber and said liquid slug chamber from external fluid sources through corresponding fluid conduits.

18. The apparatus for picking and collecting fruit of claim 16 wherein said sealing surface of said liquid valve member is longer than said sealing surface of said propellant valve member such that said propellant flow control opens before said liquid flow control raising the water pressure in said liquid slug chamber to that of the propellant gas pressure before the slug is released from said outlet.

19. The apparatus for picking and collecting fruit of claim 17 wherein said propellant chamber is charged with a high pressure gas from an external source and said liquid slug chamber is charged with predetermined volume of water.

20. The apparatus for picking and collecting fruit of claim 19 wherein said firing chamber is coupled to a high pressure gas source through said corresponding fluid conduit to selectively supply high pressure gas to said firing chamber to trigger said water cannon to move said firing actuator from said first position to said second position to move said propellant valve member and liquid valve member from said first position to said second position to open said propellant aperture and to move said liquid aperture to release the pressurized gas and the water from said propellant chamber and said liquid slug chamber respectively to discharge a water slug from said outlet.

21. The apparatus for picking and collecting fruit of claim 19 where said water cannon further includes a vent to allow air within said liquid slug chamber to vent into the atmosphere when said liquid slug chamber is filled with low-pressure water after each firing.

22. The apparatus for picking and collecting fruit of claim 21 wherein said vent comprises a valve body including a liquid float chamber having a float movably disposed therein and an air vent passage terminating in an air vent such that as water fills said liquid slug chamber water enters said liquid float chamber causing said float to rise toward a valve seat formed between said air vent passage and said air vent whereby air above the water in said liquid slug chamber is forced through said air vent passage and into the atmosphere through said air vent in advance of the water, said float rises as the water fills said liquid float chamber until said float seats against said valve seat to hold the charge of water in said liquid slug chamber until said water cannon is fired.

23. The apparatus for picking and collecting fruit of claim 9 wherein said fruit picking assembly comprises a pair of water cannon arrays each including a plurality of water cannons each movable between a retracted position and an extended position operatively mounted to a gantry by a corresponding extendable support structure and said fruit collecting assembly comprises a corresponding pair of fruit collectors movable between a stored position and an extended position pivotally mounted to said gantry by a corresponding mounting structure.

24. The apparatus for picking and collecting fruit of claim 23 wherein when in retracted position, the gantry is folded along a pivot or hinge such that said pair of the water cannon arrays are disposed parallel relative to each other disposed within the sides of said gantry.

25. The apparatus for picking and collecting fruit of claim 24 wherein when in the deployed position, said pair of water cannon arrays cooperatively form an arc over the fruit bearing trees progressively in a single row to detach fruit therefrom as said gantry is propelled through the grove.

26. The apparatus for picking and collecting fruit of claim 25 wherein when in the stored position, said fruit collectors are substantially vertically disposed between the sides of said gantry and when said fruit collectors are extended, said fruit collectors are substantially horizontally disposed to extend beneath the fruit bearing trees progressively in a single row to catch and collect fruit detached from the fruit tree by said water cannon.

\* \* \* \* \*